United States Patent
Knauer (10) Patent No.: US 11,330,319 B2
(45) Date of Patent: May 10, 2022

(54) INAUDIBLE SIGNALING TONE

(71) Applicant: LISNR, Inc., Cincinnati, OH (US)

(72) Inventor: William Knauer, Erlanger, KY (US)

(73) Assignee: LISNR, Inc., Cincinnati, OH (US)

( * ) Notice: Subject to any disclaimer, the term of this patent is extended or adjusted under 35 U.S.C. 154(b) by 649 days.

(21) Appl. No.: 15/519,990

(22) PCT Filed: Oct. 15, 2015

(86) PCT No.: PCT/US2015/055738
§ 371 (c)(1),
(2) Date: Apr. 18, 2017

(87) PCT Pub. No.: WO2016/061353
PCT Pub. Date: Apr. 21, 2016

(65) Prior Publication Data
US 2019/0200071 A1    Jun. 27, 2019

Related U.S. Application Data (60) Provisional application No. 62/064,468, filed on Oct. 15, 2014.

(51) Int. Cl.
*H04B 1/02* (2006.01)
*H04N 21/422* (2011.01)
(Continued)

(52) U.S. Cl.
CPC ....... *H04N 21/42203* (2013.01); *H04B 11/00* (2013.01); *H04N 21/4126* (2013.01);
(Continued)

(58) Field of Classification Search
None
See application file for complete search history.

(56) References Cited

U.S. PATENT DOCUMENTS 5,159,703 A    10/1992    Lowery
5,335,250 A    8/1994    Dent et al.
(Continued)

FOREIGN PATENT DOCUMENTS

CN    1149366 A    5/1997
CN    102625982 A    8/2012
(Continued)

OTHER PUBLICATIONS

Chitode, J.S. Communication Theory. 2002. Technical Publications. Prune. 5-28. Sec. 5-6 near 5-7 Source Coding Theorem (Shannon's First Theorem). (Year: 2002).*
(Continued)

*Primary Examiner* — Isam A Alsomiri
*Assistant Examiner* — Jonathan D Armstrong
(74) *Attorney, Agent, or Firm* — Wood Herron & Evans LLP (57) ABSTRACT

A method of encoding, and decoding, a human-inaudible acoustic signal 240 embedded within audio content, suitable for use within the processor of an encoding and broadcasting system or a decoding and receiving system 200, 202. A binary message is encoded into a sequence 1000, 2000 of symbols selected from a group of four or eight symbols, each symbol encoding two or three binary bits with an associated frequency. The human-inaudible acoustic signal may have a variable length, with the length of the signal encoded in a header 1002-1008, 2002-2009. The encoding uses both forward error correction and cyclic redundancy coding to increase the robustness of the transmission. Furthermore, the binary bits encoded by the symbols are selected such that a Hamming distance of a single bit transformation exists between symbols associated with adjacent frequencies, so that a frequency error creates only a single bit error.

37 Claims, 6 Drawing Sheets

| | ↙2020 | ↙2022 | ↙2024 | ↙2026 | ↙2028 | ↙2030 |
|---|---|---|---|---|---|---|
| Frequency | 18.7 kHz | 18.8 kHz | 18.9 kHz | 19.0 kHz | 19.1 kHz | 19.2 kHz |
| Duration | 36⅔ msec | 36⅔ msec | 36⅔ msec | 36⅔ msec | 36⅔ msec | 36⅔ msec |
| Samples at 44.1 kHz | 1617 | 1617 | 1617 | 1617 | 1617 | 1617 |
| Samples at 48 kHz | 1760 | 1760 | 1760 | 1760 | 1760 | 1760 |
| Symbol value (2 bit encoding)* | 00 | 01 | 11 | 10 | prefix_low | prefix_high |

(51) Int. Cl.
  *H04N 21/41*      (2011.01)
  *H04N 21/439*     (2011.01)
  *H04N 21/462*     (2011.01)
  *H04N 21/658*     (2011.01)
  *H04B 11/00*      (2006.01)

(52) U.S. Cl.
  CPC ..... *H04N 21/4394* (2013.01); *H04N 21/4622* (2013.01); *H04N 21/6581* (2013.01)

(56) References Cited

U.S. PATENT DOCUMENTS

| | | | |
|---|---|---|---|
| 5,485,839 | A | 1/1996 | Aida et al. |
| 5,565,921 | A * | 10/1996 | Sasaki ................. H04N 19/159 375/240.13 |
| 5,764,763 | A | 6/1998 | Jensen et al. |
| 5,889,870 | A | 3/1999 | Norris |
| 5,923,252 | A | 7/1999 | Sizer et al. |
| 5,995,512 | A | 11/1999 | Pogue, Jr. |
| 6,301,368 | B1 * | 10/2001 | Bolle ..................... G06T 1/0028 382/100 |
| 6,511,426 | B1 * | 1/2003 | Hossack ............... G01S 15/899 600/437 |
| 6,570,500 | B1 | 5/2003 | Pieper |
| 6,664,913 | B1 * | 12/2003 | Craven ............... H03M 7/3046 341/138 |
| 6,891,482 | B2 * | 5/2005 | Craven ............... H03M 7/3046 341/50 |
| 6,912,319 | B1 * | 6/2005 | Barnes ................. G06T 3/4084 375/E7.013 |
| 6,947,893 | B1 | 9/2005 | Iwaki et al. |
| 7,334,735 | B1 | 2/2008 | Antebi et al. |
| 7,383,297 | B1 | 6/2008 | Atsmon et al. |
| 7,904,946 | B1 | 3/2011 | Chu et al. |
| 7,995,197 | B2 * | 8/2011 | Sikora ................. H04B 10/071 356/73.1 |
| 8,140,331 | B2 | 3/2012 | Lou |
| 8,401,569 | B1 | 3/2013 | Bell et al. |
| 8,532,644 | B2 | 9/2013 | Bell et al. |
| 8,544,753 | B2 | 10/2013 | Antebi et al. |
| 8,711,656 | B1 | 4/2014 | Paulson |
| 8,976,959 | B2 | 3/2015 | Duplan et al. |
| 8,983,089 | B1 | 3/2015 | Chu et al. |
| 8,989,779 | B1 | 3/2015 | Centore, III |
| 9,024,998 | B2 | 5/2015 | Chu et al. |
| 9,111,326 | B1 | 8/2015 | Worley, III et al. |
| 9,213,969 | B2 | 12/2015 | Arentz |
| 9,318,166 | B2 | 4/2016 | Sharon et al. |
| 9,361,444 | B2 | 6/2016 | Antebi et al. |
| 9,513,861 | B2 | 12/2016 | Lin et al. |
| 9,766,702 | B2 | 9/2017 | Cieplinski et al. |
| 9,912,415 | B2 | 3/2018 | Tsfaty et al. |
| 10,044,448 | B2 | 8/2018 | Mufti |
| 10,826,623 | B2 | 11/2020 | Prince et al. |
| 2001/0049788 | A1 * | 12/2001 | Shur ..................... G06T 1/0028 713/179 |
| 2002/0008615 | A1 * | 1/2002 | Heide .................... B60R 25/24 340/426.1 |
| 2002/0152045 | A1 | 10/2002 | Dowling et al. |
| 2003/0065727 | A1 | 4/2003 | Clarke et al. |
| 2003/0117896 | A1 | 6/2003 | Sakuma et al. |
| 2003/0206602 | A1 | 11/2003 | Yamamoto |
| 2003/0217269 | A1 | 11/2003 | Gantman et al. |
| 2004/0018018 | A1 | 1/2004 | Izadpanah |
| 2004/0111360 | A1 | 6/2004 | Albanese |
| 2005/0008325 | A1 | 1/2005 | Ollis et al. |
| 2005/0171649 | A1 * | 8/2005 | Adachi ............... G01C 21/3691 701/1 |
| 2005/0177361 | A1 | 8/2005 | Srinivasan |
| 2005/0190768 | A1 | 9/2005 | Cutler |
| 2006/0041759 | A1 | 2/2006 | Kaliski et al. |
| 2006/0123239 | A1 | 6/2006 | Martinian et al. |
| 2006/0136544 | A1 | 6/2006 | Atsmon et al. |
| 2006/0138231 | A1 | 6/2006 | Elberbaum |
| 2007/0153091 | A1 | 7/2007 | Watlington et al. |
| 2007/0220544 | A1 | 9/2007 | Nash-Putnam |
| 2007/0272750 | A1 | 11/2007 | Bjorklund |
| 2008/0071537 | A1 | 3/2008 | Tamir et al. |
| 2008/0134264 | A1 | 6/2008 | Narendra et al. |
| 2008/0157938 | A1 | 7/2008 | Sutardja |
| 2008/0165022 | A1 | 7/2008 | Herz et al. |
| 2008/0173717 | A1 | 7/2008 | Antebi et al. |
| 2008/0227436 | A1 | 9/2008 | Gantman et al. |
| 2008/0228498 | A1 | 9/2008 | Gasque |
| 2009/0019061 | A1 | 1/2009 | Scannell, Jr. |
| 2009/0088133 | A1 | 4/2009 | Orlassino |
| 2009/0110033 | A1 * | 4/2009 | Shattil ................. H04J 13/0077 375/141 |
| 2009/0210789 | A1 | 8/2009 | Thakkar et al. |
| 2010/0034474 | A1 * | 2/2010 | Crucs ....................... G06T 9/00 382/233 |
| 2010/0053169 | A1 | 3/2010 | Cook |
| 2010/0149022 | A1 * | 6/2010 | Fam ......................... G01S 7/285 342/195 |
| 2010/0165879 | A1 | 7/2010 | Gupta et al. |
| 2010/0280641 | A1 | 11/2010 | Harkness et al. |
| 2010/0305449 | A1 * | 12/2010 | Wegener ................. A61B 8/483 600/459 |
| 2010/0331689 | A1 * | 12/2010 | Wegener ................. A61B 8/06 600/443 |
| 2011/0029359 | A1 | 2/2011 | Roeding et al. |
| 2011/0099295 | A1 * | 4/2011 | Wegener ................. H03M 7/24 709/247 |
| 2011/0124399 | A1 | 5/2011 | Dutilly et al. |
| 2011/0143677 | A1 | 6/2011 | Jung et al. |
| 2011/0164595 | A1 | 7/2011 | So et al. |
| 2011/0179182 | A1 | 7/2011 | Vadla Ravnas |
| 2011/0295691 | A1 | 12/2011 | Krieter |
| 2011/0301439 | A1 | 12/2011 | Albert et al. |
| 2012/0051187 | A1 | 3/2012 | Paulson |
| 2012/0064874 | A1 | 3/2012 | Pierce, Jr. et al. |
| 2012/0084131 | A1 | 4/2012 | Bergel et al. |
| 2012/0089461 | A1 | 4/2012 | Greenspan |
| 2012/0134238 | A1 | 5/2012 | Surprenant et al. |
| 2012/0179525 | A1 | 7/2012 | Seguin et al. |
| 2012/0197738 | A1 | 8/2012 | Wakabayashi |
| 2012/0209949 | A1 | 8/2012 | Deliyannis et al. |
| 2012/0214416 | A1 | 8/2012 | Kent et al. |
| 2012/0232906 | A1 | 9/2012 | Lindahl |
| 2012/0290648 | A1 | 11/2012 | Sharkey |
| 2012/0295560 | A1 | 11/2012 | Mufti |
| 2013/0078988 | A1 | 3/2013 | Bell et al. |
| 2013/0079057 | A1 | 3/2013 | Bell et al. |
| 2013/0082850 | A1 * | 4/2013 | Takeshima .......... H03M 7/3068 341/65 |
| 2013/0106977 | A1 | 5/2013 | Chu et al. |
| 2013/0166158 | A1 | 6/2013 | Barlsen et al. |
| 2013/0176984 | A1 | 7/2013 | Koezuka |
| 2013/0185137 | A1 | 7/2013 | Shafi et al. |
| 2013/0262539 | A1 * | 10/2013 | Wegener ................. G06F 7/483 708/204 |
| 2013/0273968 | A1 * | 10/2013 | Rhoads ................. G06K 9/6253 455/556.1 |
| 2013/0279300 | A1 | 10/2013 | Iwase et al. |
| 2014/0039654 | A1 | 2/2014 | Akiyama et al. |
| 2014/0045586 | A1 | 2/2014 | Allen et al. |
| 2014/0050321 | A1 * | 2/2014 | Albert ................... H04W 12/04 380/270 |
| 2014/0101738 | A1 | 4/2014 | Sama |
| 2014/0129232 | A1 | 5/2014 | Jones et al. |
| 2014/0140503 | A1 | 5/2014 | Duplan et al. |
| 2014/0172141 | A1 | 6/2014 | Mangold |
| 2014/0210122 | A1 | 7/2014 | Chung et al. |
| 2014/0327677 | A1 | 11/2014 | Walker |
| 2014/0369527 | A1 | 12/2014 | Baldwin |
| 2015/0113094 | A1 | 4/2015 | Williams et al. |
| 2015/0243163 | A1 | 8/2015 | Shoemake |
| 2015/0297193 | A1 * | 10/2015 | Rothberg ............... A61B 8/4483 600/459 |
| 2015/0309151 | A1 | 10/2015 | Shibata et al. |
| 2016/0142157 | A1 | 5/2016 | Jeong et al. |
| 2016/0373430 | A1 | 12/2016 | Bhat et al. |

(56) References Cited

U.S. PATENT DOCUMENTS

| | | | |
|---|---|---|---|
| 2017/0099114 A1* | 4/2017 | Donmez | ............... H04L 27/144 |
| 2017/0279542 A1 | 9/2017 | Knauer et al. | |
| 2017/0279571 A1 | 9/2017 | Melodia et al. | |
| 2018/0132298 A1 | 5/2018 | Birnam et al. | |
| 2018/0167147 A1 | 6/2018 | Almada et al. | |
| 2018/0329676 A1 | 11/2018 | Williams et al. | |
| 2019/0096412 A1 | 3/2019 | Knauer et al. | |
| 2019/0190621 A1 | 6/2019 | Prince et al. | |
| 2019/0204409 A1* | 7/2019 | Booij | ........................ G01S 5/26 |
| 2019/0253101 A1 | 8/2019 | Kilian et al. | |
| 2019/0268078 A1 | 8/2019 | Okunev et al. | |

FOREIGN PATENT DOCUMENTS

| | | | |
|---|---|---|---|
| CN | 103 023 583 B | 4/2015 | |
| EP | 0273815 B1 * | 1/1993 | ............. H04L 27/22 |
| EP | 1758308 A1 | 2/2007 | |
| EP | 2847984 A1 | 3/2015 | |
| EP | 3207639 A1 | 8/2017 | |
| EP | 3358811 A1 | 8/2018 | |
| JP | 06-90296 A | 3/1994 | |
| JP | 2001-320337 A | 11/2001 | |
| JP | 2003-179561 A | 6/2003 | |
| JP | 2003-1744404 A | 6/2003 | |
| JP | 2003-324491 A | 11/2003 | |
| JP | 2007-164659 A | 6/2007 | |
| JP | 2008-293393 A | 12/2008 | |
| JP | 2011-141784 A | 7/2011 | |
| JP | 2012-525655 A | 10/2012 | |
| KR | 10-1136279 B1 | 4/2012 | |
| RU | 2326495 C2 | 6/2008 | |
| WO | 2002/45273 A2 | 6/2002 | |
| WO | 2005/122483 A1 | 12/2005 | |
| WO | 2013/129587 A1 | 9/2013 | |
| WO | 2013/166158 A1 | 11/2013 | |
| WO | 2014/069617 A1 | 5/2014 | |
| WO | 2014/104284 A1 | 7/2014 | |
| WO | 2016/061353 A1 | 4/2016 | |
| WO | 2016123047 A1 | 8/2016 | |
| WO | 2019067861 A1 | 4/2019 | |

OTHER PUBLICATIONS

Markus Kuhn. Digital Signal Processing. 2011. University of Cambridge. Computer Laboratory, url: [http://www.cl.cam.ac.uk/teaching/1011/DSP/] (Year: 2011).*

Ezenugu, Isaac A. "Analytical Computation Of The Error Probability Of Coherent M-Ary Frequency Shift Key Modulation Scheme." (Year: 2014).*

Hosman, Thomas, Mark Yeary, and John K. Antonio. "Design and characterization of an MFSK-based transmitter/receiver for ultrasonic communication through metallic structures." IEEE Transactions on Instrumentation and Measurement 60.12 (2011): 3767-3774. (Year: 2011).*

Peng, Shaolin. "Design and Evaluation of Propagation-delay-limited Low-cost Communication Systems." (2011). (Year: 2011).*

Chen, Changsheng; QR Code Authentication with Embedded Message Authentication Code; Mobile Networks and Applications 22.3; 383-394, New York: Springer Nature B.V. (Jun. 2017) Published Online Nov. 17, 2016.

Kuhn, Markus; Digital Signal Processing; University of Cambridge, Computer Laboratory; http://www.cl.cam.ac.uk/teaching/1112/DSP, Michaelmas 2011—Part II.

Min, G. et al., "Performance Analysis of Different Phase Shift Keying Modulation Schemes in Aeronautical Channels", Jun. 2009.

Lee et al.; Chirp Signal-Based Aerial Acoustic Communication for Smart Devices; 2015.

* cited by examiner

| Field | Prefix 1002 | Align 1004 | Version 1006 | CRC 1008 | Data 1010 | Source | Iteration 1014 | Unused 1016 |
|---|---|---|---|---|---|---|---|---|
| Size | 4 | 4 | 4 | 8 | 16 | 4 | 8 | 4 |
| Purpose | Static beacon to facilitation location of transmission start | Static symbol sequence to enable temporal alignment | Encoding version identifier for future expansion | Error detecting code for symbols of 1004 through 1016 (40 symbols) | Content of transmission | Data source identifier | Transmission repetition sequence number | (Possible future applications) |

2.08 sec Beacon Iteration 1000

FIG. 2B

| | 1020 | 1022 | 1024 | 1026 | 1028 | 1030 | 1032 | 1034 |
|---|---|---|---|---|---|---|---|---|
| Frequency | 18.7 kHz | 18.8 kHz | 18.9 kHz | 19.0 kHz | 19.1 kHz | 19.2 kHz | 19.3 kHz | 19.4 kHz |
| Duration | 40 msec | 40 msec | 40 msec | 40 msec | 40 msec | 40 msec | 40 msec | 40 msec |
| Samples at 44.1 kHz | 1764 | 1764 | 1764 | 1764 | 1764 | 1764 | 1764 | 1764 |
| Symbol (2 bit encoding) | 00 | 01 | 10 | 11 | <unused> | <unused> | <unused> | <unused> |
| Symbol (3 bit encoding) | 000 | 001 | 010 | 011 | 100 | 101 | 110 | 111 |

| | Variable Length Beacon 2000 | | | | |
|---|---|---|---|---|---|
| Field | Prefix 2002 | Header Version 2006 | Header Length 2008 | Header CRC 2009 | Payload 2010 |
| Size (symbols) | 6 symbols | 6 symbols | 6 symbols | 6 symbols | 6 - 1530 symbols (1-255 bytes) |
| Purpose | Static beacon to facilitation location of transmission start | Encoding version identifier for future expansion | Length of Beacon (bytes of payload 1 to 255) | CRC rate 2/3 encoding of version and length data | Content of transmission plus redundancy coding |

Fig. 5

| | 2020 | 2022 | 2024 | 2026 | 2028 | 2030 |
|---|---|---|---|---|---|---|
| Frequency | 18.7 kHz | 18.8 kHz | 18.9 kHz | 19.0 kHz | 19.1 kHz | 19.2 kHz |
| Duration | 36⅔ msec | 36⅔ msec | 36⅔ msec | 36⅔ msec | 36⅔ msec | 36⅔ msec |
| Samples at 44.1 kHz | 1617 | 1617 | 1617 | 1617 | 1617 | 1617 |
| Samples at 48 kHz | 1760 | 1760 | 1760 | 1760 | 1760 | 1760 |
| Symbol value (2 bit encoding)* | 00 | 01 | 11 | 10 | prefix_low | prefix_high |

Fig. 6

| | | | 220 msec 6 Symbol Prefix 2002 | | | |
|---|---|---|---|---|---|---|
| Symbol | 1 | 2 | 3 | 4 | 5 | 6 |
| Symbol Value | prefix_high | prefix_high | prefix_high | prefix_low | prefix_low | prefix_low |

Fig. 7A

| | 1.32 Second 1 Byte Payload 2010a | |
|---|---|---|
| Field | Content | |
| Size (symbols) | 12 | 4 | 2 |
| Purpose | CRC | Data | ECC |

| | 1.32 Second 1 Byte Payload 2010a | | |
|---|---|---|---|
| Field | \multicolumn{3}{Content} | | |
| Size (symbols) | 12 | 4 | 2 |
| Purpose | CRC of data | Data | ECC |

Fig. 7B

| | 2.42 Second 6 Byte Payload 2010b | | |
|---|---|---|---|
| Field | Content | | |
| Size (symbols) | 12 | 24 | 12 |
| Purpose | CRC of data | Data | ECC |

Fig. 7C

| | 8.14 Second 32 Byte Payload 2010c | | |
|---|---|---|---|
| Field | Content | | |
| Size (symbols) | 12 | 128 | 64 |
| Purpose | CRC of data | Data | ECC |

INAUDIBLE SIGNALING TONE

TECHNICAL FIELD

This application generally relates to systems and methods for delivering content from a remote content provider to a mobile device based on one or more inaudible signals received by the device.

CROSS REFERENCE TO RELATED APPLICATION

This application claims benefits of U.S. Provisional Patent Application Ser. No. 62/064,468 filed Oct. 15, 2015, which is incorporated herein in its entirety. This application is related to PCT Application Serial No. US/2013/039079 filed May 1, 2013, which was published in the United States on Apr. 23, 2015 as Publication US2015-0113094, and which claims benefit of US Provisional patent Application Ser. No. 61/781,107 filed Mar. 14, 2013 and 61/640,900 filed May 1, 2012, each of which is incorporated herein by reference in its entirety.

BACKGROUND OF THE INVENTION

Various proposals have been made to include inaudible signaling tones into audio content that is broadcast or played back audibly in a public or private environment, or delivered electronically. The inaudible signal is designed for reception and decoding by a decoding device, such as a portable multifunction device. For example, the inaudible signal may be embedded in audio content that is received by a microphone of the decoding device. The source of the signal may be any audio speaker within the proximity of the portable multifunction device, or the audio content may be supplied for decoding by an on-board audio generating application, such as music player module, or an on-board video player application, such as video player module, or provided to a line-out port (such as a headphone jack) of a decoding device, or provided to an external speaker of the decoding device.

Example systems and methods for embedding inaudible signals into audio content are provided in the above-referenced PCT Application, as well as the following US patent applications, the entirety of which applications is hereby incorporated by reference in their entirety: U.S. patent application Ser. No. 13/286,613 entitled "SYSTEM EFFECTIVE TO MODULATE A CODE AND PROVIDE CONTENT TO A USER" filed Nov. 1, 2011, U.S. patent application Ser. No. 13/286,670 entitled "SYSTEM EFFECTIVE TO DEMODULATE A MODULATED CODE AND PROVIDE CONTENT TO A USER" filed September Nov. 1, 2011, and U.S. patent application Ser. No. 13/286,727 entitled "DEVICE EFFECTIVE TO MODULATE A CODE AND TO PROVIDE CONTENT TO A USER" filed Nov. 1, 2011.

Inaudible signals as described in these filings, are signals that are outside the range of human hearing or other signals not otherwise detectable by humans. For example, in some embodiments, the inaudible signal may be generated by frequencies above 20,000 Hz or less than 20 Hz, or in a frequency band near to 20,000 Hz or near to 20 Hz which is generally inaudible. The inaudible signal may be the form of a modulated code, as described in the above-reference patent applications, which is a series of logic 0s and 1s. The modulated code may be repeatedly and periodically output by the sound source, enabling the decoding device to identify and demodulate the modulated code in the inaudible signal to determine the logical series of 0s and 1s associated with the inaudible signal. In some embodiments, the logical series of 0s and 1s may be, for example, a coded identifier which can be transmitted to a content management system via various communications protocols.

As used herein, the term inaudible signal is used to broadly refer to any type of signal, code, frequency, waveform, or otherwise that may be transmitted by a source and detected by a decoding device. The inaudible signal may be processed by the decoding device by a process or routine passively running on the decoding device.

The previously described systems for producing inaudible signals have a number of limitations, specifically in the integrity of data transmission, and in the flexibility of the system to handle data efficiently, e.g., to embed data of different sizes for different applications. Thus, there is a need for an improvement in the methods of formatting and transmitting inaudible signals to allow for greater flexibility and functionality than has been previously available.

SUMMARY OF THE INVENTION

In accordance with principles of the present invention, these needs are addressed by a method of encoding, and decoding, a human-inaudible acoustic signal embedded within audio content, suitable for use within the processor of an encoding and broadcasting system or a decoding and receiving system. According to principles of the invention, a binary message is encoded into a human-inaudible acoustic signal for delivery as audio content to a recipient by encoding the binary message into a sequence of symbols selected from a group of two or more symbols, each symbol associated with frequency characteristics, generating audio samples of a digitized version of the sequence of samples using the frequency characteristics associated with the symbols, and providing the audio samples for playback by an audio device.

In embodiments described herein, the encoding can comprise the use of one or more of forward error correction and cyclic redundancy coding, or both, to increase the robustness of the transmission. Furthermore, the binary bits encoded by the symbols are selected such that a Hamming distance of a single bit transformation exists between symbols associated with adjacent frequencies, so that a frequency error creates only a single bit error.

Decoding of the signal involves delivering samples of a digitized version of audio content including the human-inaudible acoustic signal into a processor of a decoding device, correlating the audio content within the samples with a prefix template for a prefix of the human-inaudible acoustic signal to identify candidate samples potentially associated with the start of said human-inaudible acoustic signal, and repeatedly performing a frequency domain transformation of samples of the candidate samples and comparing frequency domain transformations thereof to frequency characteristics associated with two or more candidate symbols to generate a symbol sequence.

To validate the sample sequence, an error correction decoding can be performed upon the symbol sequence to determine its validity, so that upon identifying a valid symbol sequence, the symbol sequence may be transmitted as the decoded equivalent of the human-inaudible acoustic signal.

Human-inaudible acoustic signals may be transmitted with other audio content or be provided separately from other audio content. Furthermore, the acoustic signal may be broadcast, or stored in a recording media for playback. Detection of the human inaudible acoustic signal can be done by, for example, a microphone, an on-board speaker, an audio input, or an audio output. For a passive detection system, a processor may periodically query for audio samples from an audio source to evaluate for the presence of human-inaudible acoustic signals.

The human-inaudible signal can be used for messaging regarding deliverable content, in which case the decoded equivalent of the human-inaudible acoustic signal is used to generate a message to a content management system, which can provide content for presentation to a user. Other information that can be provided with the decoded signal includes: time data, date data, accelerometer data, geographic data, demographic data, content delivery device data, and content delivery device user data. Furthermore, the content provided by the content management system can be delivered with an indication of a presentation time after the time of receipt.

The symbols may encode a series of two or more logical bits, in various embodiments; for example, four candidate symbols may encode two bits each, or eight candidate symbols may encode three bits each. Furthermore, the format of the encoded human-inaudible signal may include a count of a number of symbols included in the human-inaudible acoustic signal, so that upon decoding that count is first decoded, and then subsequent symbols are decoded in a number corresponding to the count.

BRIEF DESCRIPTION OF THE DRAWINGS

The present disclosure will be more readily understood from a detailed description of some example embodiments taken in conjunction with the following figures.

DETAILED DESCRIPTION

Various non-limiting embodiments of the present disclosure will now be described to provide an overall understanding of the principles of the structure, function, and use of the content delivery and management systems and processes disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with the embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

The presently disclosed embodiments are generally directed to beacon iteration formats used to transmit data in an inaudible signaling tone, and the configuration of decoding devices to detect inaudible signal tones that are thus transmitted. The decoding device may be configured to then supply, e.g. wirelessly, an indication of the inaudible signal that was received to a content management system. Upon receipt of the indication of the received inaudible signal from the decoding device, the content management system may provide particular content to the decoding device based on the particular inaudible signal received, as is discussed in detail in the above-referenced prior patent filings.

Figure 1:
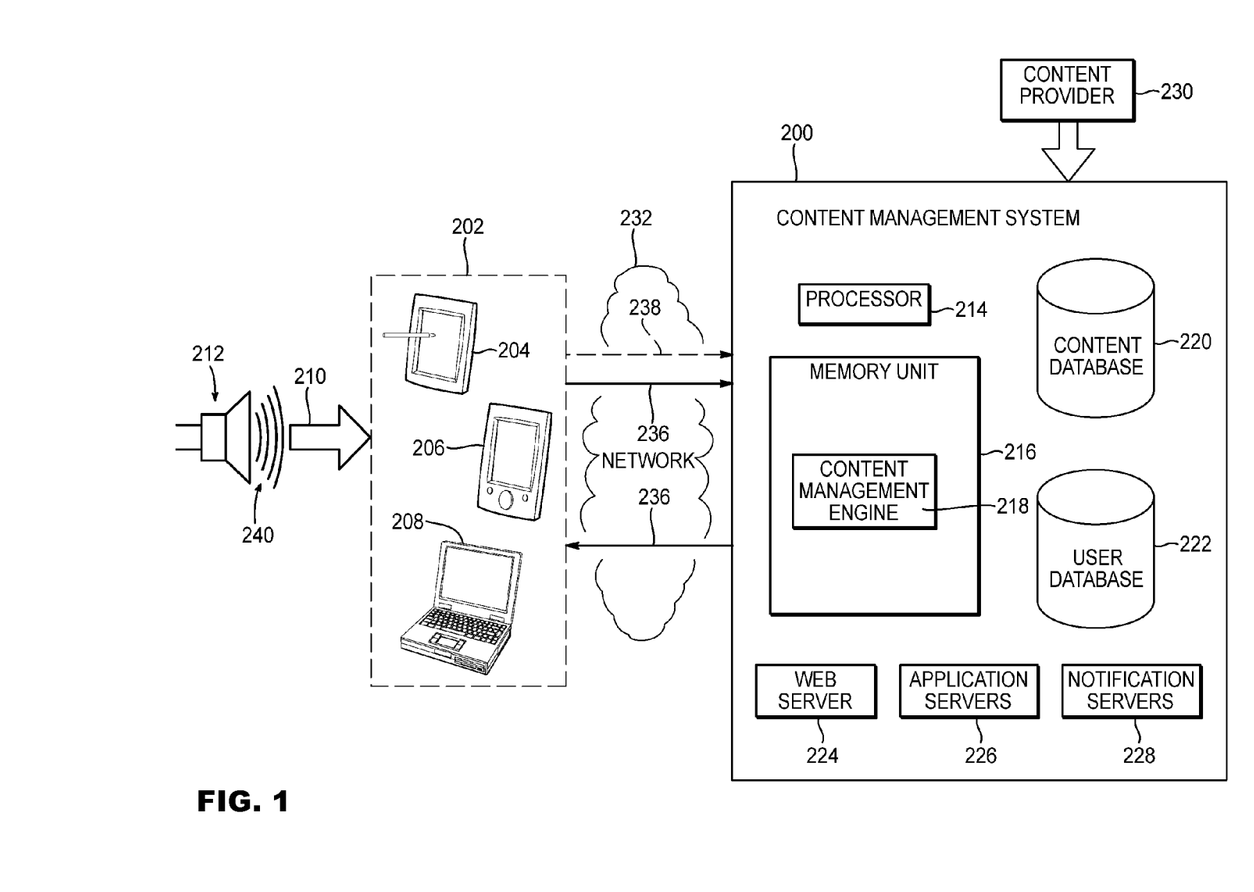
FIG. 1 shows an embodiment of the environment of use of the present invention, illustrating portable multifunction devices in communication with content management systems.

FIG. 1 illustrates one example embodiment of the present disclosure which comprises a content management system 200 that receives and processes information affiliated with inaudible signals which has been decoded by decoding devices which, in this embodiment, are portable multifunction devices 202. In this embodiment, the content management system 200 may then determine which content to provide to users and then wirelessly provide the content to portable multifunction devices 202 associated with the users. The content management system 200 may be provided using any suitable processor-based device or system, such as a personal computer, laptop, server, mainframe, or a collection (e.g., network) of multiple computers, for example. The content management system 200 may include one or more processors 214 and one or more computer memory units 216. For convenience, only one processor 214 and only one memory unit 216 are shown in FIG. 1. The processor 214 may execute software instructions stored on the memory unit 216. The processor 214 may be implemented as an integrated circuit (IC) having one or multiple cores. The memory unit 216 may include volatile and/or non-volatile memory units. Volatile memory units may include random access memory (RAM), for example. Non-volatile memory units may include read only memory (ROM), for example, as well as mechanical non-volatile memory systems, such as, for example, a hard disk drive, an optical disk drive, etc. The RAM and/or ROM memory units may be implemented as discrete memory ICs, for example.

The memory unit 216 may store executable software and data for content management engine 218. When the processor 214 of the content management system 200 executes the software of the content management engine 218, the processor 214 may be caused to perform the various operations of the content management system 200. Operations may include, without limitation, receive an indication of an inaudible signal from a portable communication device 202 (such as in the form of a coded identifier 234, for example), identify content associated with the coded identifier, receive and analyze supplemental information received from the portable communication device 202, and send content 236 to the portable communication device 202 via a wireless communication network. Data used by the content management engine 218 may be from various sources, such as a content database 220, which may be an electronic computer database, for example. The data stored in the content database 220 may be stored in a non-volatile computer memory, such as a hard disk drive, a read only memory (e.g., a ROM IC), or other types of non-volatile memory. Also, the data of the content database 220 may be stored on a remote electronic computer system, for example. The data in the content database 220 may be, without limitation, video content, audio content, text-based content, and so forth. The pieces of content in the content database 220 may be tied to a particular coded identifier, for example. In some embodiments, a content provider 230 may use a web portal, application program interface (API), or other form of interface to provide and manage content of the content management system 200. For example, a content provider 230 may provide instructions to the content management system 200 to send content "A", "B", and "C" to portable multifunction devices 202 that supply a coded identifier "X".

User database 222, which may be an electronic computer database, for example, may also provide used by the content management engine 218. The data stored in the user database 222 may be stored in a non-volatile computer memory, such as a hard disk drive, a read only memory (e.g., a ROM IC), or other types of non-volatile memory. Also, the data of the user database 222 may be stored on a remote electronic computer system, for example. Data stored in the user database 222 may related to information regarding particular users of the content management system 200, such as triggers, user preferences, and so forth.

The content management system 200 may be in communication with portable multifunction devices 202 via an electronic communications network 232. The communications network may include a number of computer and/or data networks, including the Internet, LANs, WANs, GPRS networks, etc., and may comprise wired and/or wireless communication links. The portable multifunction devices 202 that communicate with the content management system 200 may be any type of client device suitable for communication over the network, such as a personal computer, a laptop computer, or a netbook computer, for example. In some example embodiments, a user may communicate with the network via a portable multifunction device 202 that is a combination handheld computer and mobile telephone, sometimes referred to as a smart phone. It can be appreciated that while certain embodiments may be described in connection with user communication via a smart phone or laptop by way of example, the communication may be implemented using other types of user equipment or wireless computing devices such as a mobile telephone, personal digital assistant (PDA), combination mobile telephone/PDA, handheld device, mobile unit, game device, messaging device, media player, or other suitable mobile communications devices.

By way of illustration, FIG. 2 shows example portable multifunction devices 202 being utilized in practice of principles of the present invention, including a tablet computer 204, a smart phone 206, and a laptop 208. Other types of portable multifunction devices may be used.

Some of the portable multifunction devices 202 also may support wireless wide area network (WWAN) data communications services including Internet access. Examples of WWAN data communications services may include Evolution-Data Optimized or Evolution-Data only (EV-DO), Long Term Evolution (LTE), Evolution For Data and Voice (EV-DV), CDMA/1×RTT, GSM with General Packet Radio Service systems (GSM/GPRS), Enhanced Data Rates for Global Evolution (EDGE), High Speed Downlink Packet Access (HSDPA), High Speed Uplink Packet Access (HSUPA), and others. The user device 102 may provide wireless local area network (WLAN) data communications functionality in accordance with the Institute of Electrical and Electronics Engineers (IEEE) 802.xx series of protocols, such as the IEEE 802.11a/b/g/n series of standard protocols and variants (also referred to as "Wi-Fi"), the IEEE 802.16 series of standard protocols and variants (also referred to as "WiMAX"), the IEEE 802.20 series of standard protocols and variants, and others.

In some example embodiments, the portable multifunction devices 202 also may be arranged to perform data communications functionality in accordance with shorter range wireless networks, such as a wireless personal area network (PAN) offering Bluetooth® data communications services in accordance with the Bluetooth®. Special Interest Group (SIG) series of protocols, specifications, profiles, and so forth. Other examples of shorter range wireless networks may employ infrared (IR) techniques or near-field communication techniques and protocols, such as electromagnetic induction (EMI) techniques including passive or active radio-frequency identification (RFID) protocols and devices.

The portable multifunction device 202 may provide a variety of applications for allowing a user to accomplish one or more specific tasks using the content management system 200. The portable multifunction device 202 may comprise various software programs such as system programs and applications to provide computing capabilities in accordance with the described embodiments. System programs may include, without limitation, an operating system (OS), device drivers, programming tools, utility programs, software libraries, application programming interfaces (APIs), and so forth. As is to be appreciated, the portable multifunction device 202 may include any suitable OS, such as a mobile OS (ANDROID, BLACKBERRY OS, iOS, SYMBIAN OS, WINDOWS PHONE, and so forth), a desktop OS (MAC OS X, LINUX, WINDOWS, GOOGLE CHROME OS, and so forth) or a television OS (GOOGLE TV, APPLE TV, or other Smart TV OS), for example.

Other decoding devices, such as stationary devices connected to AC mains power and wired networks, are also contemplated and within the scope of principles of the present invention.

In various embodiments, a decoding device may detect the inaudible signal through a generally passive detection process. In other words, a user of the decoding device does not necessarily have to routinely initiate or activate the detection process. Instead, the detection process may be a background routine that operates in the random access memory (RAM) of a decoding device, for example. The background routine may periodically, or at least routinely, query signals received or generated by various on-board components of the decoding device in order to detect if an inaudible signal is present. These queries may be performed without additional input from the user. Components queried by the detection process may include, without limitation, on-board microphones, on-board speakers, and other audio output ports (such as a headphone output or a line level output, for example).

The inaudible signal may be received by the decoding device from any suitable source. For example, the inaudible signal may be embedded in audio content that is received by a microphone of the decoding device. In this regard, the source may be any audio speaker within the proximity of the decoding device. The audio content may also be supplied by an on-board audio generating application, such as music player module, or an on-board video player application, such as video player module, or provided to a line-out port (such as a headphone jack) or an external speaker of the decoding device.

Upon detecting an inaudible signal, the decoding device may process the inaudible signal to extract a coded identifier. The extraction process may be a generally passive process which may be performed by the processor of the decoding device. In some embodiments, the coded identifier may then be provided to a content management system via a wireless communication network. Supplemental information may also be provided to the content management system along with the coded identifier, such as a time/date data, accelerometer data, geographic data, demographic data, device data, owner data, and so forth. The content management system may process the received information to identify content to transmit to the decoding device. The content may be stored locally to the content management system or may be stored in data stores remote from the content management system. In any event, the content may be in any suitable file format or file type. A non-limiting and non-exhaustive list of example content that may be provided to a decoding device includes video-based content, audio-based content, image-based content, and text-based content. Video-based content may include, without limitation, concert footage, music videos, artist interviews, movies, commercials and so forth. Audio-based content may include, without limitation, songs, ringtones, and so forth. Image-based content may include, without limitation, pictures, logos, wallpapers, and so forth. Text-based content may include, without limitation, lyrics, quotes, coupons, passwords, passcodes, email messages, text messages, instant messages, and so forth. In some embodiments, the content may be advertisements or educational in nature. This disclosure is not limited to any particular content which may be delivered to decoding devices associated with the content management system.

In various embodiments, the particular content delivered to a decoding device may be based on the coded identifier and one or more triggers. Over time additional content may be accessible (unlocked) as the decoding device, or user of the device, satisfies various thresholds. For example, the number of times a particular inaudible signal has been received by the device may determine which content is sent to the device. If the inaudible signal is embedded in a song, the number of times the inaudible signal is received may indicate the number of times the song has been listened to by a user associated with the device. As the user listens to the song more and more, additional content ("unlocked content") may be delivered to that user's device. As is to be appreciated, that additional content may be labeled or otherwise considered as "exclusive" content that is only available to certain types or groups of listeners. For example, an inaudible signal may be broadcast at a music venue while an artist is performing a concert. Audience members having devices passively detecting for inaudible signals will receive and process the inaudible signal. The device may then extract the coded identifier and provide the information to a content management system via a wireless communications network. The content management system may match the coded identifier to stored content associated with the performing artist. The content may then be pushed to the decoding device that originally sent the coded identifier. The user will then be able to access the content via their decoding device. Thus, in the illustrated embodiment, the decoding device passively detected the inaudible signal, extracted the coded identifier, transmitted the coded identifier and received affiliated content without any input or interaction from a user.

In some embodiments, the particular content delivered to a decoding device may be function of where the device is geographically located. In other words, decoding devices in a first city that passively detect a certain inaudible signal may receive a first piece of content while decoding devices in a second city that detect the same inaudible signal may receive a second piece of content. Additionally, the content delivered to the decoding device may depend on other triggers, such as whether the decoding device is moving (in a car), the time of day, user preferences, and so forth.

The content received by the decoding device may be stored, arranged, and viewed in any suitable configuration. The content may be viewed at the time of receipt or at a later point in time. In one embodiment, content is delivered to an electronic mailbox associated with the user. In one embodiment, content is delivered to an application or module that is executable by the decoding device. A user can execute the application and access the content. As is to be appreciated, the content can be sorted in any suitable hierarchy or schema. In some embodiments, "locked" content may be displayed to the user through the application. In order to unlock the content, the user must, for example, satisfy certain parameters or thresholds. The thresholds may relate to a total number of listens, a geographic location, and so forth. In any event, when content is received by the decoding device, a notification may be provided to the user by the decoding device. In one embodiment, upon receiving the notification, the user can then navigate the associated application to view the content received.

Inaudible signals may, in one embodiment, be embedded in audio songs. The disclosure herein, however, is not so limited. In fact, the systems and methods described herein may be used across a wide variety of platforms and implementations. For example, the passive detection routines described herein can be used to detect inaudible signals associated with television shows, commercials, movies, and the like. In some embodiments, the passive detection routines described herein can be used to detect stand-alone inaudible signals that are not embedded in audio signals. Such stand-alone inaudible signals may be transmitted in, for example, commerce/shopping environments, business environments, music venues, entertainment venues, or any other suitable environments or venues. Decoding devices may also be configured to transmit inaudible signals using its on-board speaker, for example. The inaudible signal may be received and processed by other decoding devices positioned proximate the transmitting decoding device. In any event, upon passively detecting the inaudible signal and providing an indication of the inaudible signal to a content management system, particular content can be delivered to the decoding device in accordance with the systems and methods described herein.

Figure 2A:
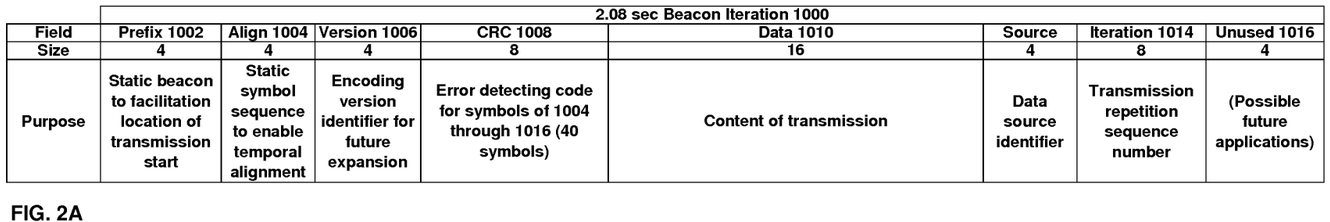
FIG. 2A is a diagram illustrating the content of a beacon iteration 1000 used to transmit data according to a first embodiment of principles of the present invention.

FIG. 2A illustrates a data transmission format suitable for a fixed length inaudible beacon of the type contemplated by the present invention. This format constitutes an approximately two second sequence of 52 symbols, each symbol comprising 40 milliseconds of radiated sound. The full set of 52 symbols will hereafter be referred to as a beacon iteration 1000.

Within the beacon iteration 1000, the first four symbols 1002 are a static beginning sequence that is used to locate the start over transmitted beacon iteration. The next four symbols 1004 comprise an alignment sequence, also of static symbols, that enable temporal alignment of the remaining symbols (see below). The following four symbols 1006 are used to identify an encoding version used by the beacon iteration, which enables future modification of the encoding method of the beacon interaction while maintaining reverse compatibility. The next eight symbols comprise an error detecting codeword 1008 which is created from the 40 symbols in sections 1004 through 1016, which are used to detect transmission errors as described below. The subsequent 16 symbols comprise a data word 1010 which is the content transmitted by the beacon iteration. The following four symbols comprise a data source identifier 1012 indicating the source (e.g. publisher) of the transmitted content. The subsequent eight symbols comprise a sequence number 1014 which is used to sequentially identify beacon iteration transmissions as they are transmitted—content is typically transmitted in a sequence of iterations which includes repeating transmissions. (Repeating transmissions permit greater error resilience.) The final four symbols 1016 are unused in the format shown in FIG. 2A; these symbols may be used to hold additional or expanded data in possible future applications using different beacon iteration encoding versions.

Figure 2B:
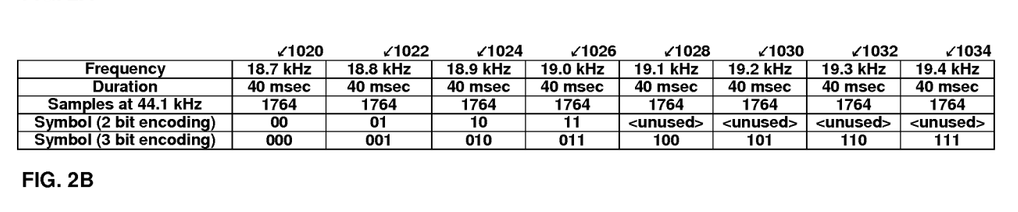
FIG. 2B is a diagram illustrating the encoding of symbols used in the beacon iteration of FIG. 2A as inaudible audio tones.

As illustrated in FIG. 2B, each symbol comprises 1764 samples of audio data sampled at 44.1 kHz, which extends for 40 milliseconds at a 44.1 kHz audio sampling rate. The 1764 samples that comprise a symbol encode an audio tone at a frequency in the range of 18.7-19.4 kHz, which is generally inaudible to humans.

The data value represented by a symbol is indicated by the specific audio frequency encoded into the 1764 samples of the symbol. In one embodiment, four two-bit data values ranging from 00 to 11 are encoded by symbols using the frequencies 18.7 kHz (1020), 18.8 kHz (1022), 18.9 kHz (1024) and 19.0 kHz (1026).

In an alternative embodiment seen in the last row of FIG. 2B, three bits of data ranging from 000-111 may be encoded by symbols using the four frequencies noted above and the additional four frequencies at 19.1 kHz (1028), 19.2 kHz (1030), 19.3 kHz (1032) and 19.42 Hz (1034).

Figure 4:
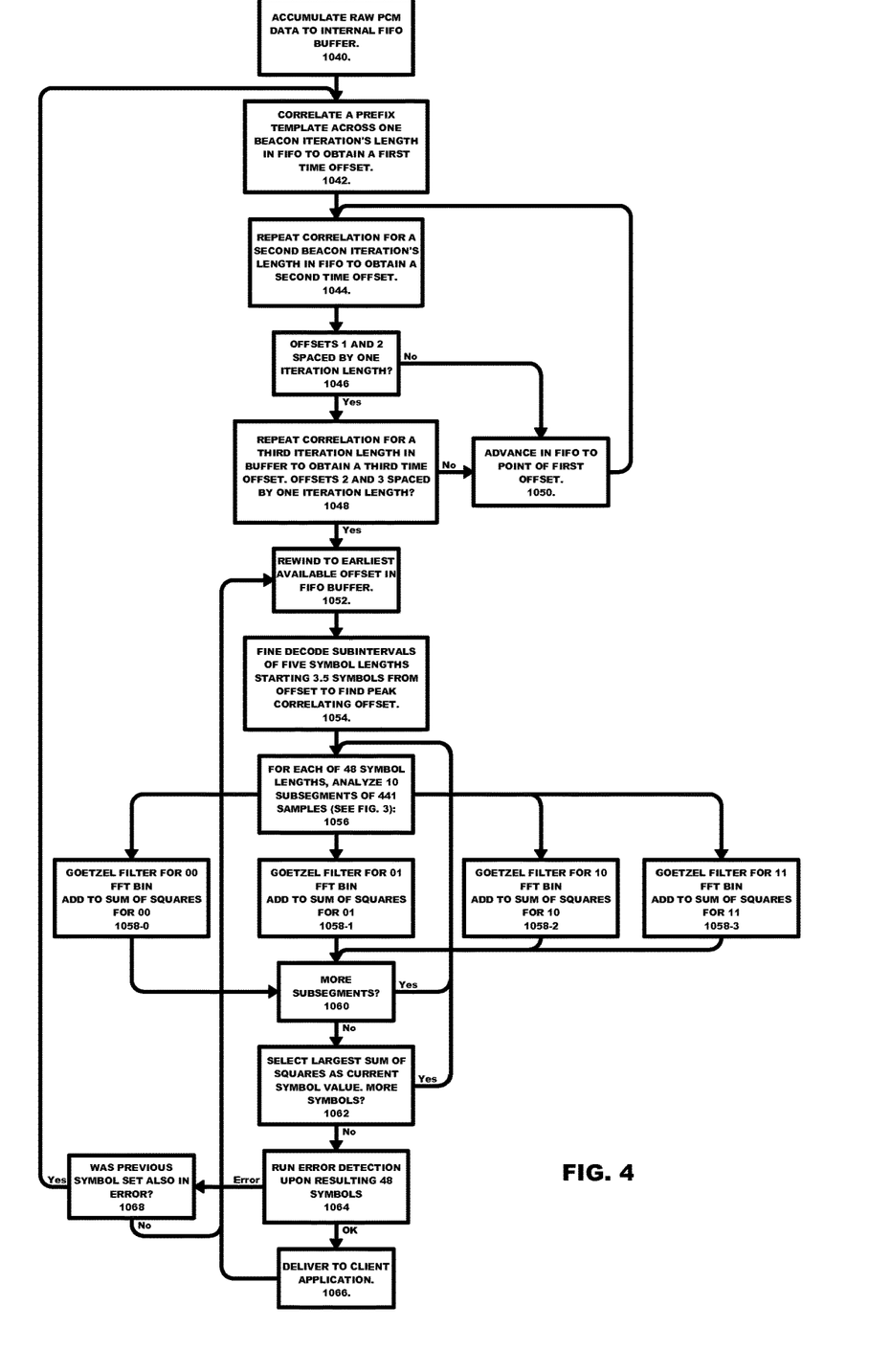
FIG. 4 is a flow chart illustrating a process for identifying and decoding beacon iterations that are received, to deliver the corresponding symbols to a client application according to the first embodiment of principles of the present invention.

Referring FIG. 4, a process which may be used to decode a beacon iteration as described above includes a number of steps, implemented upon raw pulse code modulated (PCM) data obtained from a microphone or other source. The raw PCM data is stored into an internal first in first out (FIFO) buffer.

Data is accumulated in the FIFO buffer until a sufficient amount of data is available to begin analyzing the data to find beacon iterations. In step 1040 a prefix template corresponding to the prefixes used by transmitted beacon iterations is correlated to approximately 2 seconds of data in the FIFO, to attempt to identify the beginning location of a beacon. The location in the FIFO which correlates best to the prefix template is stored as a first time offset; this time offset is a candidate for the beginning of a received beacon iteration in the FIFO.

In step 1044 for a correlation operation is repeated for a second length of approximately 2 seconds of data in the FIFO, attempting to identify a second time offset which has the highest correlation to the prefix template. After the steps, in step 1046 the time offsets obtained in steps 1042 and 1044 are compared to determine if they are spaced by approximately one beacon iteration length. If not, in step 1050 the data in the FIFO is advanced to the point of the first offset to continue to search for an iteration in subsequent data in the FIFO.

If in step 1048 the two located offsets are spaced by one iteration's length, then instep 1048 further correlation is performed through the buffer seeking to find a third time offset which is best correlated to the prefix template. When this is obtained, the spacing of the second and third offset are evaluated to determine if they also correspond to the length of one beacon iteration. If not, then in step 1050 the data in the FIFO is advanced and processing returns to step 1044.

In the event that the above correlation operations have located three offsets spaced approximately the proper interval, then it is likely that beacon iterations have been received and can be decoded. In this event in step 1052 the data in the FIFO is rewound to the earliest available offset to begin evaluating the data for begin iteration symbols.

To decode each symbol in a beacon iteration, a fine time alignment process is performed to discretely identify the time locations of transmitted symbols. In step 1054, a time window of five sample lengths immediately following the identified location of the received prefix 1002 is decoded. This time window is decoded into sub intervals, each of which is correlated to the expected static alignment symbols 1004 (FIG. 1); the greatest correlation is assumed to be where the static alignment symbols are precisely located. This time reference may then be used to select the exact location of the subsequent symbols from the received beacon iteration.

Figure 3:
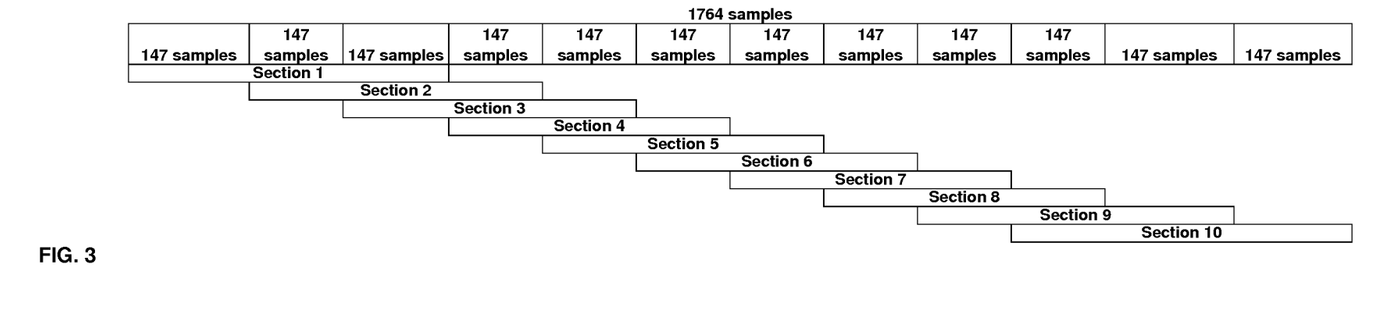
FIG. 3 is a diagram illustrating the sectioning of a symbol length of a received beacon iteration as part of decoding that symbol length to identify the associated symbol value.

After fine timing alignment, the remaining 48 symbols of the beacon iteration are then analyzed to identify the data values of those symbols. This process analyzes each symbol by breaking the symbol into 10 subsegments, each comprising 441 samples (see FIG. 3). Each of the 10 subsegments is then passed through Goertzel filtering algorithms to measure the amount of signal power in the subsegment that appears at each of the, e.g., four symbol frequencies being used in the encoding method. In the illustrated embodiment, four encoding frequencies are used, encoding symbol values 00, 01, 10, and 11, and so each sub segment is passed through four filtering algorithms to identify the signal power at each of the four frequencies that are used to encode symbols. In other embodiments a greater number of frequencies, e.g., 8 frequencies, may be used to encode symbols, and detected by corresponding Goertzel filters.

As part of evaluating all of the subsegments of a symbol through steps from 1056 through 1060, the resulting signal power values generated for each of the (four) candidate frequencies are combined in a sum-of-squares methodology, to generate an overall value for the entire symbol interval that is reflective of how much signal power exists in the entire interval at a candidate frequency. These sum of square values can be compared to determine which of the candidate frequencies has the greatest signal power for the entire symbol interval. Specifically, at step 1062, the largest sum of squares value is used to determine the current symbol value. Processing then moves to the next symbol to be analyzed in the same methodology.

After all symbols have been analyzed, processing continues to step 1064 in which error detection is performed upon the resulting 48 symbols, using the error detection code symbols obtained from section 1008 of the beacon iteration. If the error detection coding indicates that there are no errors, then the resulting symbols are delivered to the client application and step 1066.

If, however, an error is detected, then the symbols of the beacon iteration are discarded, and processing will continue to step 1068, where it is determined whether the previous set of symbols (corresponding to the previously decoded beacon iteration) were also determined to be in error. If not, processing will continue to step 1052 and attempt to decode symbols of the subsequent beacon iteration. If, however, two beacon iteration intervals in a row have decoded into erroneous data, then it may be concluded that there is no beacon transmission, or the timing of the transmission has become erroneous, and in this case processing proceeds from step 1068 to step 1042 to reinitiate the process of searching for and synchronizing to future beacon iterations.

Figure 5:
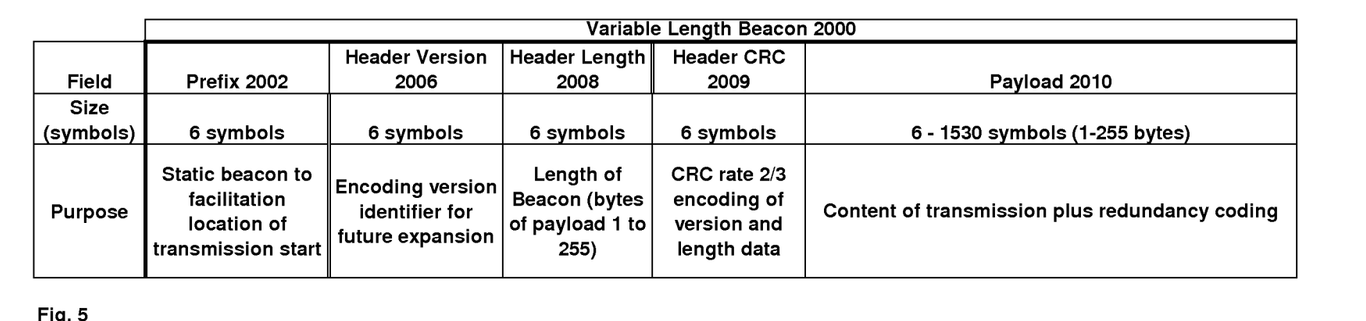
FIG. 5 is a diagram illustrating the content of a variable length beacon iteration 2000 used to transmit data according to a second embodiment of principles of the present invention.

FIG. 5 illustrates beacon iteration 2000 using a variable length data transmission format that is also suitable for an inaudible beacon of the type contemplated by the present invention, but which differs from the beacon iteration 1000 of FIG. 1 in that a variable length payload can be transmitted by this format, and the format incorporates greater redundancy coding to enable greater robustness of data transmission. This format constitutes between 30 and 1554 transmitted symbols, each symbol comprising 36⅔ milliseconds of radiated sound, for a total beacon iteration length of between 1.1 and 57 seconds. The full set of symbols will hereafter be referred to as a beacon iteration 2000.

Within the beacon iteration 2000, the first six symbols 2002 are a static beginning sequence that is used to locate the start over transmitted beacon iteration (see FIG. 7A, below). The next six symbols 2006 provide a 12-bit value that identifies an encoding version used by the beacon iteration, which enables future modification of the encoding method of the beacon interaction while maintaining reverse compatibility.

The next six symbols in the beacon iteration 2000 comprise a header length field 2008, indicating the length of the beacon payload, which in this embodiment is a number of bytes between 1 and 255, which requires, as noted, between 6 and 1530 symbols using the encoding methods described below with reference to FIGS. 7B, 7C and 7D. The header length field 2008 may, for example, comprise six symbols or 12 bits, which encode an 8-bit value between 1 and 255 representing the length (in bytes) of the payload. This 8 bit value may, for example, be encoded in 12 bits using a 2/3 error correcting code.

Immediately following the header length field 2008 are six symbols 2009 which comprise a header cyclic redundancy check (CRC) field, including redundancy bits providing redundancy for the header version field 2006 and header length field 2008. Error correcting coding uses a 2/3 cyclic redundancy encoding, providing a high level of data integrity, which is important to this format particularly because inaccurate payload length information can cause the erroneous loss of many beacon payloads.

Following the header fields 2006, 2008 and 2009, is the payload 2010 which, as noted, encodes a payload of between 1 and 255 bytes, using between 6 and 1530 symbols, for example by the use of coding methods described below with reference to FIGS. 7B, 7C and 7D.

Figure 6:
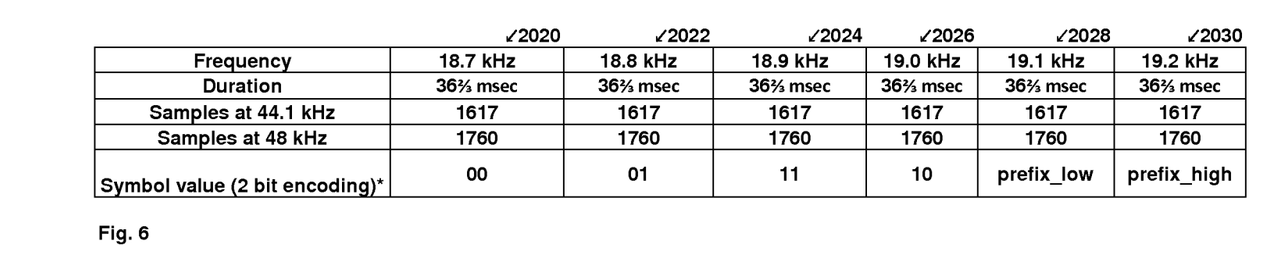
FIG. 6 is a diagram illustrating the encoding of symbols used in the beacon iteration of FIG. 5 as inaudible audio tones.

As illustrated in FIG. 6, each symbol comprises 1617 samples of audio data at a 44.1 kHz sample rate, or 1760 samples of audio data at a 48 kHz sample rate, generating an audio tone over a period of 36⅔ milliseconds. The 1617 or 1760 samples that comprise a symbol encode an audio tone at a frequency in the range of 18.7-19.2 kHz, which is generally inaudible to humans.

The data value represented by a symbol is indicated by the specific audio frequency encoded into the 1617/1760 samples of the symbol. In one embodiment, each symbol encodes a 2-bit value, and four such 2-bit values ranging from 00 to 11 are encoded by symbols using the frequencies 18.7 kHz (2020), 18.8 kHz (2022), 18.9 kHz (2024) and 19.0 kHz (2026). Notably, the symbol values are encoded in the sequence 00, 01, 11, 10, so that the Hamming distance between symbols using adjacent frequencies is only 1 bit, which increases the error correction effectiveness; specifically, a mis-decode into an immediately adjacent frequency will cause only a one bit mis-decode of the symbol, whereas due to the error correction coding uses, two bit errors are required in a symbol to cause a miscode.

The two highest frequencies of 19.1 kHz and 19.2 kHz are used to encode symbol values which are used only in the prefix field 2002, thus aiding in the separate detection of prefixes; the 19.1 kHz frequency is used for a "prefix_low" symbol and the 19.2 kHz frequency is used for a "prefix_high" symbol, as discussed next with reference to FIG. 7A.

Figure 7A:
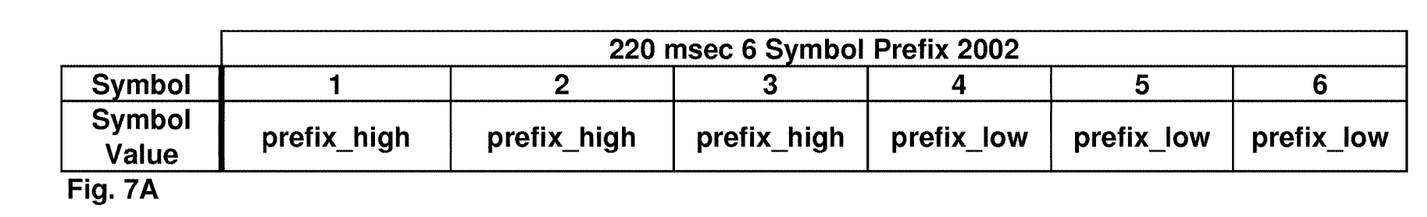
FIG. 7A illustrates the format of the prefix 2002 of the variable length beacon iteration 2000 of FIG. 5.

FIG. 7A shows the format of a symbol prefix 2002, which includes six symbols which spans a 220 millisecond period. The format of the prefix is three "prefix_high" symbols followed by three "prefix_low" symbols. Because the "prefix_high" and "prefix_low" symbols use frequencies that are outside the range used for data symbols, they are made more readily detected for beacon iteration synchronization and capture, as described below with reference to FIG. 8.

Figure 7B:
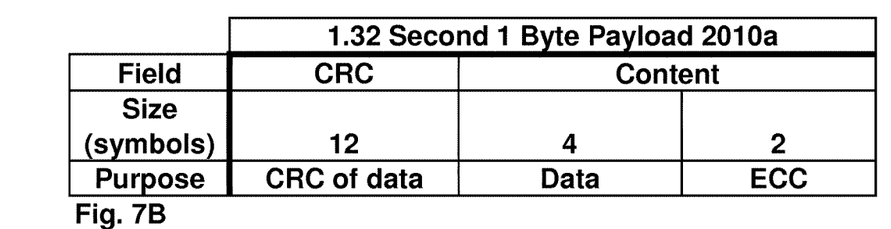
FIGS. 7B, 7C and 7D illustrate the payload formats for a 1 byte, 6 byte and 32 byte payload for the variable length beacon iteration 2000 of FIG. 5.
Figure 7C:
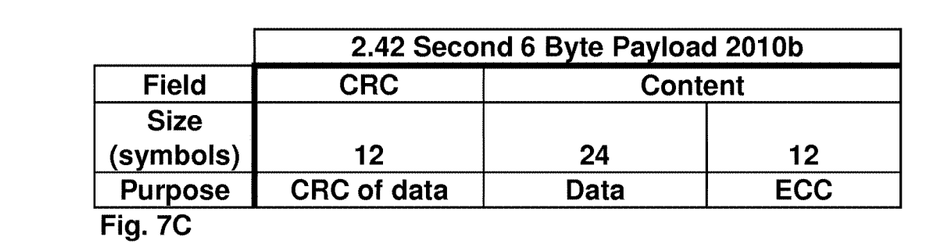
Figure 7D:
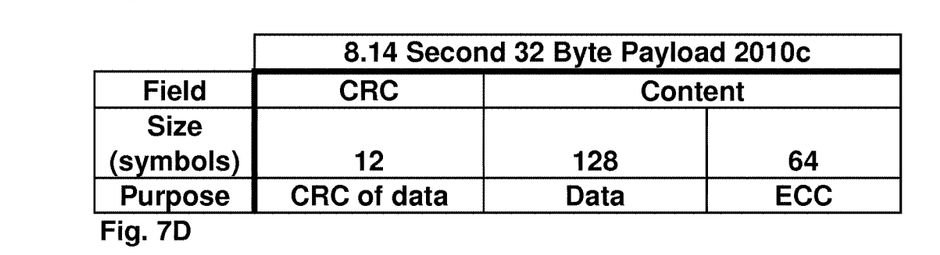

FIGS. 7B, 7C and 7D illustrate the payload formats for a 1-byte, 6-byte and 32-byte payload format, identified as 2010a, 2010b and 2010c, respectively. Other formats are contemplated by the present invention, for example by extension of the formats shown in these figures. Each format includes a 12 symbol (24 bit) cyclic redundancy check (CRC) code for the data included in the payload. Further, the content of the payload includes an appropriate number of symbols to encode the bytes of the payload, using a 3/2 error correcting coding. Thus in a 1 byte payload 2010a, the content comprises 6 symbols, or 12 bits, encoding an 8-bit byte of content. A 6 byte payload 2010b provides content in 36 symbols, or 72 bits, encoding 6 8-bit bytes of content using a 3/2 error corroding coding. Finally, in a 32 byte payload 2010c, the content comprises 192 symbols, or 384 bits, encoding 32 8-bit bytes of content using 3/2 error correction coding.

Figure 8:
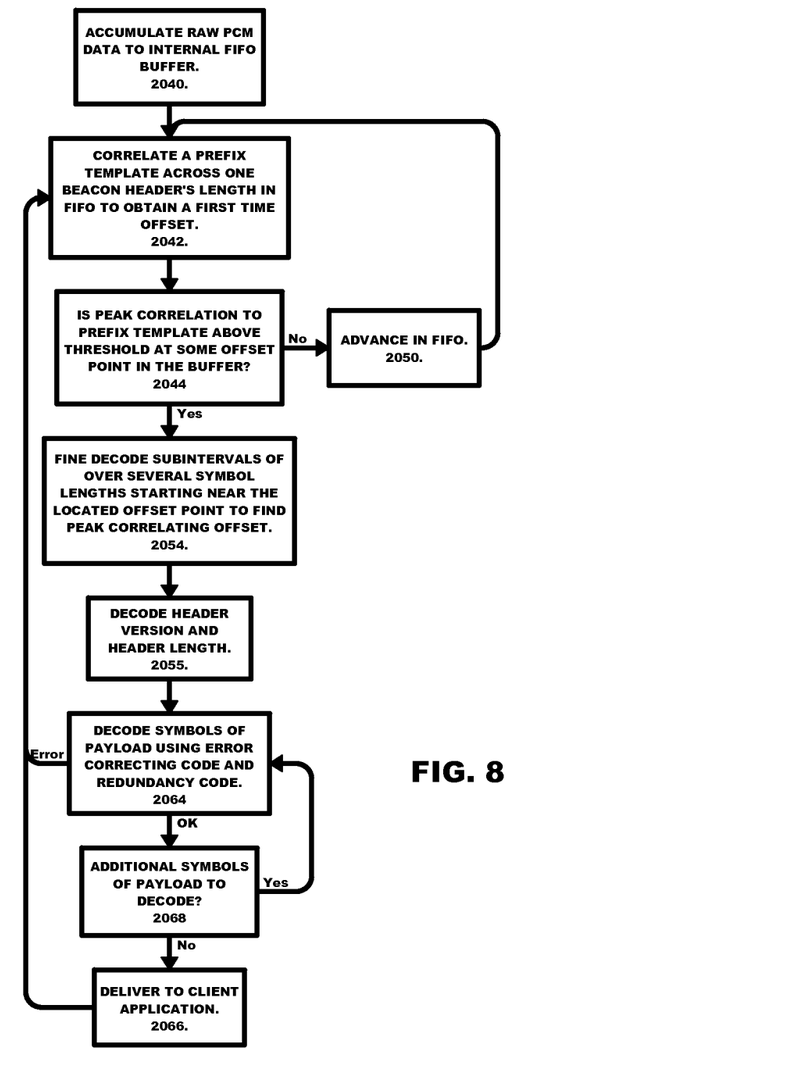
FIG. 8 is a flow chart illustrating a process identifying and decoding beacon iterations that are received in the format of FIG. 5, to deliver the corresponding symbols to a client application according to the second embodiment of principles of the present invention.

Referring now to FIG. 8, a process which may be used to decode a variable length beacon iteration as described above includes a number of steps, implemented upon raw pulse code modulated (PCM) data obtained from a microphone or other source. The raw PCM data is stored into an internal first in first out (FIFO) buffer.

Data is accumulated in the FIFO buffer until a sufficient amount of data is available to begin analyzing the data to find a beacon iteration header. In step 2040 a prefix template corresponding to the prefixes used by transmitted beacon iterations is correlated to data in the FIFO approximately equal to the length of a beacon, to attempt to identify the beginning location of a beacon. The location in the FIFO which correlates best to the prefix template is identified (step 2042), and the peak correlation at that locate is compared to a threshold. If the threshold is not met, then the data in the FIFO is deemed to not include a beacon header, and the FIFO is advanced (step 2050). If, however, the peak correlation to the prefix template exceeds the threshold for recognition, then in step 2054 the symbols of the header are found accurately, e.g., through a step of fine decoding subintervals over several symbol lengths (step 2054) in a manner similar to that described above with reference to FIGS. 3 and 4. This will find the times of the symbol boundaries, as a consequence of which, in step 2064 the header may be decoded to obtain a version and header length content identifying the number of bytes in the payload following the header. Thereafter, symbols are decoded from the payload, using error correcting coding and redundancy codes to correct errors (step 2064). So long as there are additional symbols to decode (step 2068) this process continues. If there is an error, the process returns to step 2042 to search for a new beacon interval prefix. After all symbols of the payload are decoded in step 2064, the resulting content is delivered to the client application (step 2066) and the process returns to step 2042 to search for a new beacon interval prefix.

As described herein, a software application may be executed on a decoding device to allow a user to access and store content received from the content management system. The application may also allow a user to provide user preferences to the content management system. As is to be appreciated, the application may be structured in a number of ways.

In general, it will be apparent to one of ordinary skill in the art that at least some of the embodiments described herein may be implemented in many different embodiments of software, firmware, and/or hardware. The software and firmware code may be executed by a processor or any other similar computing device. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes associated with the present embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, or hard disk drives. A computer-readable medium may also include memory storage that is physical, virtual, permanent, temporary, semipermanent, and/or semitemporary.

A "computer," "computer system," "host," "server," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software modules used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media.

In various embodiments disclosed herein, a single component may be replaced by multiple components and multiple components may be replaced by a single component to perform a given function or functions. Except where such substitution would not be operative, such substitution is within the intended scope of the embodiments. Any servers described herein, for example, may be replaced by a "server farm" or other grouping of networked servers (such as server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand and/or providing backup contingency in the event of component failure or reduction in operability.

The computer systems may comprise one or more processors in communication with memory (e.g., RAM or ROM) via one or more data buses. The data buses may carry electrical signals between the processor(s) and the memory. The processor and the memory may comprise electrical circuits that conduct electrical current. Charge states of various components of the circuits, such as solid state transistors of the processor(s) and/or memory circuit(s), may change during operation of the circuits.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed:

1. A method of decoding a human-inaudible acoustic signal embedded within audio content in the processor of a decoding device, comprising:

a. receiving samples of a digitized version of the audio content including the human-inaudible acoustic signal into the processor of a decoding device;
b. correlating the audio content within said samples with a prefix template for a prefix of the human-inaudible acoustic signal to identify candidate samples potentially associated with the start of said human-inaudible acoustic signal;
c. repeatedly performing a frequency domain transformation of samples of the candidate samples and comparing frequency domain transformations thereof to frequency characteristics associated with four or more candidate symbols, each symbol encoding two or more logical bits and associated with frequency characteristics
d. based upon the comparing, identifying a symbol sequence in which each candidate symbol is represented by two or more logical bits encoded thereby;
e. performing an error correction decoding upon the symbol sequence to determine the validity of the symbol sequence; and
f. upon identifying a valid symbol sequence, transmitting the symbol sequence as the decoded equivalent of the human-inaudible acoustic signal.

2. The method of claim 1 wherein the symbol sequence is encoded with an error correction code.

3. The method of claim 2 wherein the error correction code is a forward error correcting code.

4. The method of claim 2 wherein the error correction code is a cyclic redundancy checking code.

5. The method of claim 1 further comprising receiving detecting the human inaudible acoustic signal by use of one or more of: a microphone, an on-board speaker, an audio input, and an audio output.

6. The method of claim 1 further comprising periodically querying for audio samples to evaluate for the presence of human-inaudible acoustic signals.

7. The method of claim 1 further comprising using the decoded equivalent of the human-inaudible acoustic signal to generate a message to a content management system, and receiving from the content management system content for presentation to a user.

8. The method of claim 7 wherein the message to the content management system comprises one or more of: time data, date data, accelerometer data, geographic data, demographic data, content delivery device data, and content delivery device user data.

9. The method of claim 7 wherein the content provided by the content management system is delivered with an indication of a presentation time after the time of receipt.

10. The method of claim 1 wherein the frequency characteristics of candidate symbols are in frequency ranges outside a common range of human hearing.

11. The method of claim 10 wherein the acoustic signal is at a frequency at one or more of below 30 Hz and above 18 kHz.

12. The method of claim 1 wherein the prefix comprises symbols each of which encodes a series of two or more logical bits.

13. The method of claim 1 wherein the human-inaudible candidate symbols include a count of a number of symbols included in the human-inaudible acoustic signal.

14. The method of claim 13 further comprising obtaining from a symbol sequence that is determined to be valid, a count of a number of symbols and repeatedly thereafter performing frequency domain transformation of samples and comparing frequency domain transformations thereof to frequency characteristics associated with two or more candidate symbols, and performing error correction upon the sample sequence to generate said number of symbols in the human-inaudible acoustic signal.

15. The method of claim 1 wherein at least four candidate symbols are compared to candidate samples, the four candidate symbols each encoding at least two binary bits.

16. The method of claim 15 wherein the binary bits encoded by the candidate symbols are selected to produce a Hamming distance of one bit transformation between candidate symbols associated with adjacent frequencies.

17. The method of claim 1 further comprising generating a human-inaudible acoustic signal by encoding a binary message into a sequence of symbols selected from a group of two or more symbols, each symbol associated with frequency characteristics, generating audio samples of a digitized version of the sequence of samples using the frequency characteristics associated with the symbols, and providing the audio samples for playback by an audio device.

18. The method of claim 17 wherein the binary message is encoded into a sequence of symbols using forward error correction.

19. The method of claim 17 wherein the binary message is encoded into a sequence of symbols using cyclic redundancy coding.

20. A method of encoding a binary message into a human-inaudible acoustic signal for delivery as audio content to a recipient, comprising:
a. encoding the binary message into a sequence of symbols selected from a group of four or more symbols, each symbol encoding two or more logical bits and associated with frequency characteristics in a frequency range outside a common range of human hearing, the encoding comprising;
b. generating audio samples of a digitized version of the sequence of samples using the frequency characteristics associated with the symbols;
c. providing the audio samples for playback by an audio device.

21. The method of claim 20 further comprising receiving a message generated using the decoded human-inaudible acoustic signal and in response thereto delivering content for presentation to a user.

22. The method of claim 21 wherein the message comprises one or more of: time data, date data, accelerometer data, geographic data, demographic data, content delivery device data, and content delivery device user data.

23. The method of claim 21 wherein the content provided by the content management system is delivered with an indication of a presentation time after the time of receipt.

24. The method of claim 20 wherein the frequency characteristics of symbols are in frequency ranges outside a common range of human hearing.

25. The method of claim 24 wherein the acoustic signal is at a frequency at one or more of below 30 Hz and above 18 kHz.

26. The method of claim 20 further comprising encoding a prefix to the binary message comprising symbols selected from said group of four or more symbols, wherein the prefix symbols each encode a series of two or more logical bits.

27. The method of claim 20 wherein the symbols include a count of a number of symbols included in the human-inaudible acoustic signal.

28. The method of claim 20 wherein at least four symbols are used in encoding the binary message, the four symbols each encoding at least two binary bits.

29. A method of encoding a binary message into a human-inaudible acoustic signal for delivery as audio content to a recipient, comprising:

a. encoding the binary message into a sequence of symbols selected from a group of four or more symbols, each symbol encoding two or more logical bits and associated with frequency characteristics, the binary bits encoded by the symbols being selected to produce a Hamming distance of one bit transformation between symbols associated with adjacent frequencies;

b. generating audio samples of a digitized version of the sequence of samples using the frequency characteristics associated with the symbols;

c. providing the audio samples for playback by an audio device.

30. The method of claim 29 further comprising receiving a message generated using the decoded human-inaudible acoustic signal and in response thereto delivering content for presentation to a user.

31. The method of claim 30 wherein the message comprises one or more of:
time data, date data, accelerometer data, geographic data, demographic data, content delivery device data, and content delivery device user data.

32. The method of claim 30 wherein the content provided by the content management system is delivered with an indication of a presentation time after the time of receipt.

33. The method of claim 29 wherein the frequency characteristics of symbols are in frequency ranges outside a common range of human hearing.

34. The method of claim 33 wherein the acoustic signal is at a frequency at one or more of below 30 Hz and above 18 kHz.

35. The method of claim 29 further comprising encoding a prefix to the binary message comprising symbols selected from said group of four or more symbols, wherein the prefix symbols each encode a series of two or more logical bits.

36. The method of claim 29 wherein the human-inaudible candidate symbols include a count of a number of symbols included in the human-inaudible acoustic signal.

37. The method of claim 29 wherein at least four symbols are used in encoding the binary message, the four symbols each encoding at least two binary bits.

* * * * *